(12) United States Patent
Lacoss-Arnold et al.

(10) Patent No.: US 10,147,087 B2
(45) Date of Patent: Dec. 4, 2018

(54) PRIMARY ACCOUNT NUMBER (PAN) LENGTH ISSUER IDENTIFIER IN PAYMENT ACCOUNT NUMBER DATA FIELD OF A TRANSACTION AUTHORIZATION REQUEST MESSAGE

(71) Applicant: MasterCard International Incorporated, Purchase, NY (US)

(72) Inventors: Jason J. Lacoss-Arnold, Saint Louis, MO (US); Chandrasekhar Rao Nadella, St. Peters, MO (US); Jeffrey L. Altemueller, Marthasville, MO (US); Ganesh L. Iyer, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 749 days.

(21) Appl. No.: 14/641,087

(22) Filed: Mar. 6, 2015

(65) Prior Publication Data

US 2016/0260096 A1 Sep. 8, 2016

(51) Int. Cl.
*G06Q 20/38* (2012.01)
(52) U.S. Cl.
CPC ......... *G06Q 20/382* (2013.01); *G06Q 20/383* (2013.01); *G06Q 20/385* (2013.01)
(58) Field of Classification Search
None
See application file for complete search history.

(56) References Cited

U.S. PATENT DOCUMENTS

| | | | |
|---|---|---|---|
| 2005/0033686 A1* | 2/2005 | Peart | G06Q 20/00 705/39 |
| 2009/0030845 A1* | 1/2009 | Hurry | G06Q 20/3829 705/71 |
| 2009/0063354 A1 | 3/2009 | Sheets et al. | |
| 2010/0211445 A1* | 8/2010 | Bodington | G06Q 30/02 705/14.17 |
| 2011/0218871 A1* | 9/2011 | Singh | G06Q 20/10 705/17 |
| 2012/0317036 A1 | 12/2012 | Bower et al. | |
| 2014/0279546 A1* | 9/2014 | Poole | H04B 5/0031 705/44 |

FOREIGN PATENT DOCUMENTS

WO 2014184771 A1 11/2014

OTHER PUBLICATIONS

"PCT Search Report and Written Opinion", dated May 26, 2016, for International Application No. PCT/US2016/20867, 10 pp.

* cited by examiner

*Primary Examiner* — Tsan-Yu J Huang
*Assistant Examiner* — Gabriel S Mercado
(74) *Attorney, Agent, or Firm* — Buckley, Maschoff & Talwalkar LLC

(57) ABSTRACT

Transaction data is obtained relating to a current purchase transaction. An account indicator is retrieved. The transaction data is used to transform the account indicator. The transformed account indicator is encrypted to generate an encrypted account indicator.

5 Claims, 12 Drawing Sheets

YOURBANK

MONTHLY STATEMENT

ACCOUNT NO. 1111-2222-3333-4444

1302 {
SUB ACCOUNT-DISCRETIONARY        ─1306
NOV. 12   DEGUSTO REST      95.00
NOV. 14   JAVAPLAN           7.50
}

102.50

1304 {
SUB ACCOUNT-GENERAL
NOV. 8    GOOD GROCERY      26.43
NOV. 11   FASTGAS           38.61
NOV. 15   GOOD GROCERY      42.88  ─1308
NOV. 25   FASTGAS           36.13
}

144.05

TOTAL CHARGES        246.55

*FIG. 13*

PRIMARY ACCOUNT NUMBER (PAN) LENGTH ISSUER IDENTIFIER IN PAYMENT ACCOUNT NUMBER DATA FIELD OF A TRANSACTION AUTHORIZATION REQUEST MESSAGE

BACKGROUND

Payment accounts are in widespread use. At a point of sale, such accounts may be used for purchase transactions, and may be accessed by devices such as magnetic stripe cards, contactless or contact integrated circuit (IC) cards (also sometimes referred to as "smartcards"), or payment-enabled mobile devices, such as payment-enabled smartphones.

Proposals to provide payment-enabled mobile devices, with payment account information stored therein (or retrievable via the device from a remote server), have led to further proposals for "digital wallets". With a digital wallet, the user of a payment-enabled mobile device may be permitted, perhaps at the point of sale, to select among a number of different payment accounts that have been provisioned to, or made accessible through, the device. The payment account selected from the digital wallet by the user may be used for a current purchase transaction at the point of sale.

Security for payment account numbers (sometimes called PANs—"primary account numbers") has drawn considerable attention among payment account network operators and issuers of payment accounts. In November 2013, MasterCard International Incorporated (which is the assignee hereof), Visa and American Express jointly published an interoperability standard (hereinafter sometimes referred to as the "Tokenization Standard") in which it was proposed that alternative numbers, in the format of account numbers, and referred to as "payment tokens", be substituted for PANs during portions of payment account transactions and in accordance with a number of example use cases. For example, it has been proposed that payment tokens be provisioned to payment-enabled mobile devices in place of their corresponding PANs, and that the payment token be provided from the payment-enabled mobile device to a point of sale (POS) terminal. The payment token would then be inserted by the POS terminal in the payment account number data field of the transaction authorization request message, which would then be routed to the merchant's acquirer bank. At a subsequent stage of the transaction flow, perhaps at the network processing stage, the payment token may be used to look up the corresponding PAN. The PAN may then be inserted in the transaction authorization request message in place of the payment token, and the request may thereafter be routed to the account issuer based on the PAN. In the language of the Tokenization Standard, the function of looking up the PAN—and inserting it in the transaction authorization request message in place of the payment token—is referred to as "de-tokenization".

The present inventors have now recognized that it may prove to be advantageous to implement tokenization in a manner which avoids potential constraints on the number of tokens that can be generated. The present inventors have further recognized opportunities to provide enhanced security in the transmission of payment tokens or PANs in payment account systems. Still further, it has been recognized by the present inventors that opportunities exist to permit enhanced services to account holders in relation to reporting and tracking transactions charged to payment accounts.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein:

FIG. 13 is a simplified example monthly payment account statement that may be provided to an account holder in accordance with aspects of the present disclosure.

DETAILED DESCRIPTION

In general, and for the purpose of introducing concepts of embodiments of the present invention, payment credentials provided at the point of sale from a payment-enabled mobile device to the POS terminal may include a number that identifies the account issuer and is the same length in digits as a standard PAN in the payment system. The number may occupy a payment account number data field but may contain no account-identifying information apart from identifying the issuer.

Information that identifies the specific account for use in the current transaction may reside in a field other than the payment account number field. The account identifying information may be dynamically derived from a payment token accessed by or through the payment-enabled mobile device. Derivation of the account information may involve processing the payment token in conjunction with information concerning the present transaction, and the resulting modified payment token may then be encrypted before insertion into the non-payment-account-number field. A similar process may be applied to a device identification number assigned to the payment-enabled mobile device.

The resulting transaction authorization request message generated by the POS terminal may include the PAN-length issuer identifier together with dynamically modified and encrypted account and device identifiers. A payment support service computer may receive the transaction authorization request message, and may determine how to recover the original payment token and device identifier based on the issuer identifier.

In some embodiments, the account issuer may offer to account holders the opportunity to assign transactions to two or more sub-accounts that are associated with an account holder's payment account. At the point of sale, the account holder may be prompted by the payment-enabled mobile device to select a sub-account in addition to selecting a payment account for use in a current transaction. The information passed on from the payment-enabled mobile device to the POS terminal may reflect the account holder's choice of sub-account as well as the payment account to be used for the transaction.

System processing may translate data included in a transaction authorization request message into a suitable revised transaction authorization request message for routing to the account issuer. The system processing may use the PAN-length issuer identifier to identify the account issuer for the transaction and to recover a key and/or other data to recover encrypted, transformed account information. The revised transaction authorization request message generated by the system processing may also serve to indicate the account holder's sub-account selection to the account issuer.

Figure 1:
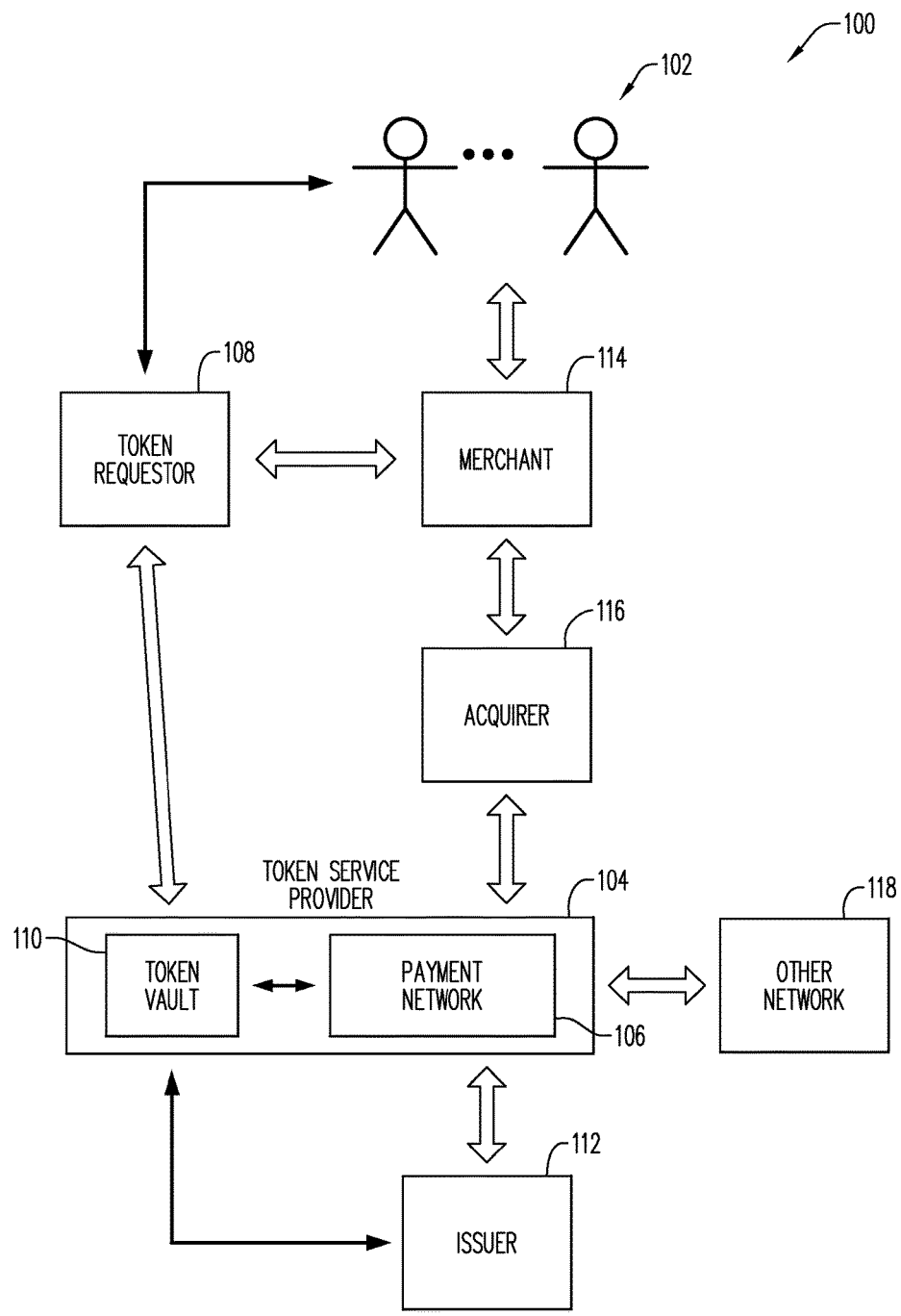
FIG. 1 is a block diagram that illustrates a payment system in which aspects of the present invention may be implemented.

FIG. 1 is a block diagram that illustrates a payment system 100 in which aspects of the present invention may be implemented. (FIG. 1 is adapted from the "FIG. 1" presented on page 10 of the Tokenization Standard.)

Individual users/account holders are indicated by reference numeral 102 in FIG. 1.

FIG. 1 also includes a block 104 that represents a token service provider. The token service provider 104 may in some embodiments also be the operator of a payment network (block 106). One well known example of a payment network is referred to as the "Banknet" system, and is operated by MasterCard International Incorporated, which is the assignee hereof.

The token service provider 104 may be authorized in the payment system 100 to issue tokens to token requestors (one such token requestor represented by block 108 in FIG. 1). In issuing tokens, the token service provider 104 may perform such functions as operating and maintaining a token vault 110, generating and issuing tokens, assuring security and proper controls, token provisioning (e.g., personalizing payment cards, etc. with token values), and registering token requestors.

In addition to representing the token service provider, block 104 should also be understood to represent one or more computer systems operated by the token service provider.

Block 112 in FIG. 1 represents an issuer of payment card accounts held by the cardholders 102.

Block 114 in FIG. 1 represents a merchant to which the cardholders may present payment devices (payment cards and/or payment-enabled smartphones, etc., none of which are shown in the drawing) to consummate a purchase transaction. In some cases the merchant 114 may also be a token requestor 108 (e.g., for implementing a tokenized card-on-file arrangement for e-commerce transactions with a cardholder 102). As is conventional, the merchant may receive a token value from a cardholder's payment device and issue a transaction authorization request message to initiate processing of a payment transaction in the payment system 100.

Block 116 in FIG. 1 represents an acquirer. As is well known, the acquirer may be a financial institution that provides banking services to the merchant 114, and that receives and routes transaction authorization request messages originated from the merchant 114.

Referring again to block 108 (token requestor), this role may be taken on by entities such as card-on-file merchants (as noted above); acquirers, acquirer processors, and payment gateways (acting for merchants); payment enablers such as OEMs (original equipment manufacturers); digital wallet service providers or issuers 112. Token requestors may be required to register with the token service provider 104.

Also shown in FIG. 1 is a block 118, representing another payment network with which the token service provider 104 may interact.

It will be readily appreciated that a practical embodiment of the payment system 100 may include numerous merchants, token requestors, acquirers and issuers, rather than one of each as depicted in FIG. 1.

At this point the term "indicator number" will be introduced. This term should be understood to include both PANs and tokens, including tokens that are presented and/or processed in encrypted and or transformed conditions that differ from the original digit sequence of the token.

Figure 2:
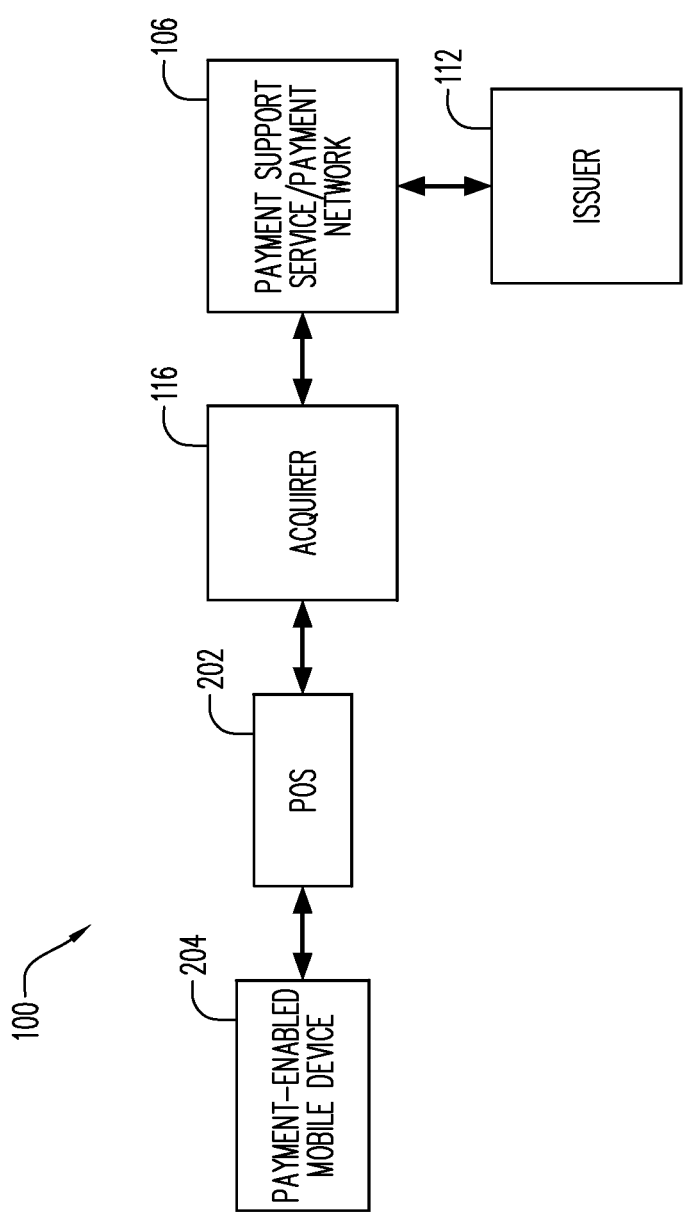
FIG. 2 is a block diagram that illustrates additional aspects of the payment system, as provided in accordance with teachings of the present disclosure.

FIG. 2 is a block diagram that presents an alternate view of the payment system 100. Blocks 106, 112 and 116 are carried over from FIG. 1, representing respectively the payment network, an issuer and an acquirer. Block 106 has been relabeled to indicate that the payment network or the operator thereof may perform payment support service functions to facilitate functions of the payment system 100 for other parties and particularly issuers.

FIG. 2 also shows a POS terminal 202, which may be operated by the merchant 114 shown in FIG. 1. Also shown in FIG. 2 is a payment-enabled mobile device 204. The payment-enabled mobile device 204 may, for example, be embodied as a suitably programmed smartphone, and may be owned and operated by one of the users 102 shown in FIG. 1.

Among the services offered by the payment support service/payment network 106 may be provisioning of payment-enabled mobile devices with tokens, payment applications, cryptographic keys, etc. This may occur at the request of payment account issuers such as issuer 112, and may be done in accordance with teachings of this disclosure to enable features and functions described herein. The payment support service/payment network 106 may also perform transaction handling and processing services to enable those features and functions. Details of operation of the payment support service/payment network 106 will be described below.

The components of the system 100 as depicted in FIG. 2 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals. The system may also include a very large number of payment account holders, who carry payment cards and/or payment-enabled mobile devices for initiating payment transactions by presenting payment credentials to a POS terminal.

Figure 3:
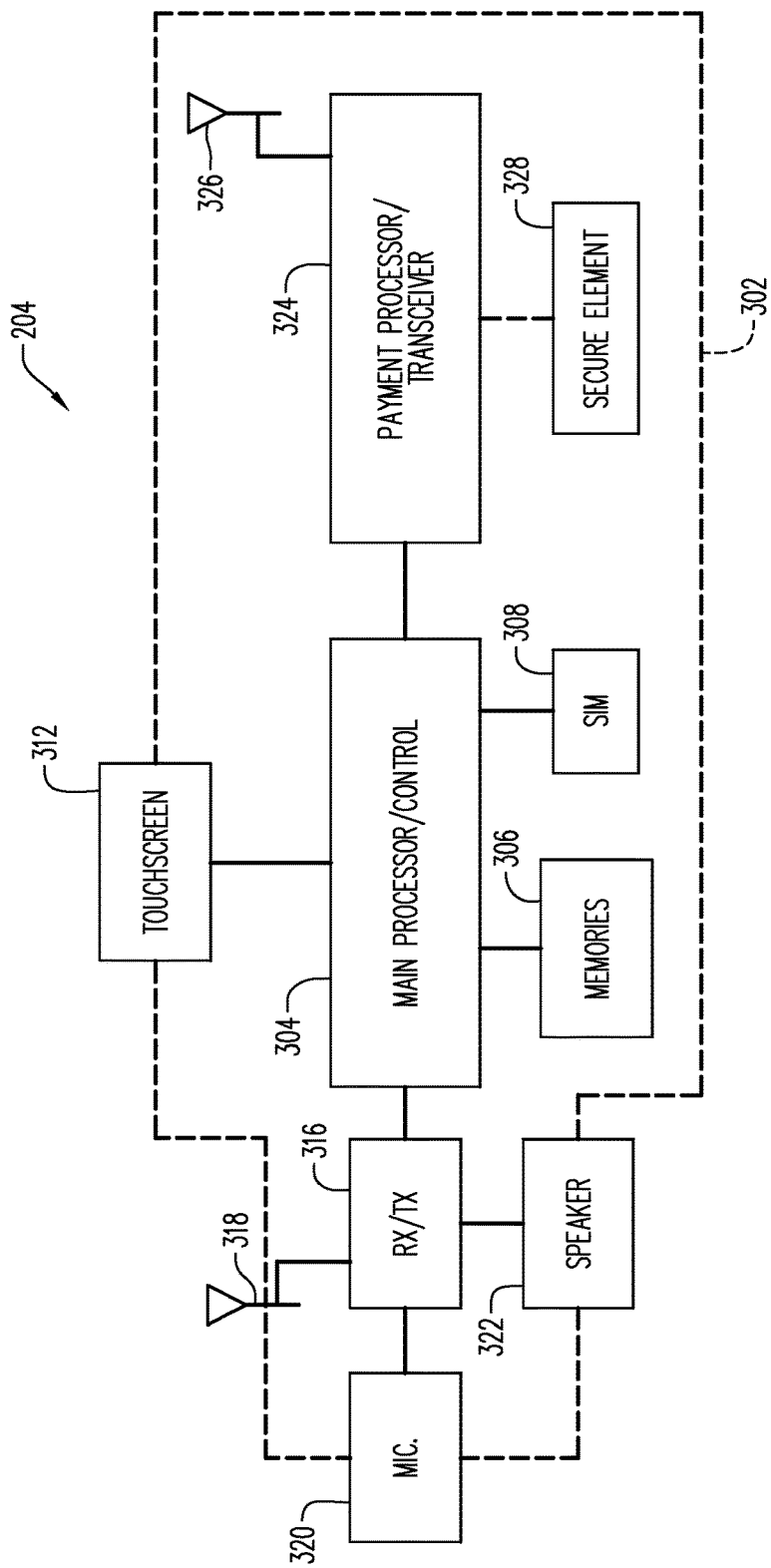
FIG. 3 is a block diagram that illustrates a payment-enabled mobile device provided in accordance with aspects of the present disclosure and that may be used in connection with the system of FIG. 2.

FIG. 3 is a block diagram that illustrates an example embodiment of the payment-enabled mobile device 204 shown in FIG. 2 and provided in accordance with aspects of the present invention. The payment-enabled mobile device 204 may be conventional in its hardware aspects. For example, the payment-enabled mobile device 204 may be a smartphone, and may resemble, in some or all of its hardware aspects and many of its functions, common commercially available smartphones. Alternatively, the payment-enabled mobile device 204 may be a tablet computer with mobile telecommunications capabilities. The ensuing description of the payment-enabled mobile device 204 is based on the assumption that it is embodied as a smartphone; those who are skilled in the art will readily understand from the following description, and from following descriptions of software aspects of the payment-enabled mobile device 204, how to embody the payment-enabled mobile device 204 as a tablet computer or other device apart from a smartphone.

The payment-enabled mobile device 204 may include a conventional housing (indicated by dashed line 302 in FIG. 3) that contains and/or supports the other components of the payment-enabled mobile device 204. The housing 302 may be shaped and sized to be held in a user's hand, and may for example exhibit the type of form factor that is common with the current generation of smartphones.

The payment-enabled mobile device 204 further includes conventional control circuitry 304, for controlling over-all operation of the payment-enabled mobile device 204. For example, the control circuitry 304 may include a conventional processor of the type designed to be the "brains" of a smartphone.

Other components of the payment-enabled mobile device 204, which are in communication with and/or controlled by the control circuitry 304, include: (a) one or more memory devices 306 (e.g., program and working memory, etc.); (b) a conventional SIM (subscriber identification module) card 308; (c) a conventional touchscreen 312 which serves as the primary input/output device for the payment-enabled mobile device 202, and which thus receives input information from the user and displays output information to the user. As is the case with many models of smartphones, in some embodiments the payment-enabled mobile device 204 may also include a few physically-actuatable switches/controls (not shown), such as an on/off/reset switch, a menu button, a "back" button, a volume control switch, etc. It may also be the case that the payment-enabled mobile device 204 includes a conventional digital camera (as is the case with many smartphones), which is not shown.

The payment-enabled mobile device 204 also includes conventional receive/transmit circuitry 316 that is also in communication with and/or controlled by the control circuitry 304. The receive/transmit circuitry 316 is coupled to an antenna 318 and provides the communication channel(s) by which the payment-enabled mobile device 204 communicates via the mobile telephone communication network (not shown). The receive/transmit circuitry 316 may operate both to receive and transmit voice signals, in addition to performing data communication functions. As is known to those who are skilled in the art, such data communication may be via HTTP (HyperText Transfer Protocol) or other communication protocol suitable for carrying out data communication over the internet.

The payment-enabled mobile device 204 further includes a conventional microphone 320, coupled to the receive/transmit circuitry 316. Of course, the microphone 320 is for receiving voice input from the user. In addition, a speaker 322 is included to provide sound output to the user, and is coupled to the receive/transmit circuitry 316.

The receive/transmit circuitry 316 may operate in a conventional fashion to transmit, via the antenna 318, voice signals generated by the microphone 320, and to reproduce, via the speaker 322, voice signals received via the antenna 318. The receive/transmit circuitry 316 may also handle transmission and reception of text messages and other data communications via the antenna 318.

The payment-enabled mobile device 204 may also include circuitry 324 that is partly or wholly dedicated to implementing NFC communications functionality of the payment-enabled mobile device 204. The payment-enabled mobile device 204 may further include a loop antenna 326, coupled to the NFC circuitry 324. In some embodiments, the NFC circuitry 324 may partially overlap with the control circuitry 304 for the payment-enabled mobile device 204. Moreover, the NFC circuitry 324 is associated with, and may also overlap with, a secure element 328 that is part of the payment-enabled mobile device 204 and is contained within the housing 302, or the NFC circuitry could be omitted in embodiments that do not utilize NFC. The term "secure element" is well known to those who are skilled in the art, and typically refers to a device that may include a small processor and volatile and nonvolatile memory (not separately shown) that are secured from tampering and/or reprogramming by suitable measures. In some embodiments, the secure element 328 may be provided as part of the SIM card 308. In other embodiments, the secure element 328 may be constituted by an integrated circuit card separate from the SIM card 308 but possibly having the same form factor as the SIM card 308. In some embodiments of the payment-enabled mobile device 204, the secure element 328 may be conventional in its hardware aspects but may be programmed in accordance with aspects of the present disclosure in a manner to be described below. (It should be noted that the term "secure element" is not intended to be limited to devices that are IC-based, but rather may also include any secure execution environment in a mobile device, and may include software based secure execution environments running on the main mobile device processor.) According to aspects of the present disclosure, in some embodiments, the secure element 328 may be provisioned with one or more payment application programs ("apps") by the payment support service/payment network 106. This may have occurred at the request of payment account issuers and/or at the request of the user of the payment-enabled mobile device 204 with the concurrence/permission of the payment account issuer(s). Similarly, the secured element 328 may have been provisioned with payment credentials for one or more payment card accounts. The payment credentials may be constituted in accordance with teachings of the present disclosure, as described further below.

It should also be understood that the payment-enabled mobile device 202 may be operable as a conventional mobile telephone for communication—both voice and data—over a conventional mobile telecommunications network, which is not depicted in the drawing. Thus, the payment-enabled mobile device 204 may be in communication from time to time in a conventional manner with a mobile network operator ("MNO"—also not shown).

As is familiar to those who are skilled in the art, the payment-enabled mobile device may be viewed as a small computing device. The payment-enabled mobile device may include one or more processors that are programmed by software, apps and/or other processor-executable steps to provide functionality as described herein. The software, apps and/or other processor-executable steps may be stored in one or more computer-readable storage media (such as the storage devices 306 and/or the secure element 328) and may comprise program instructions, which may be referred to as computer readable program code means.

Figure 4:
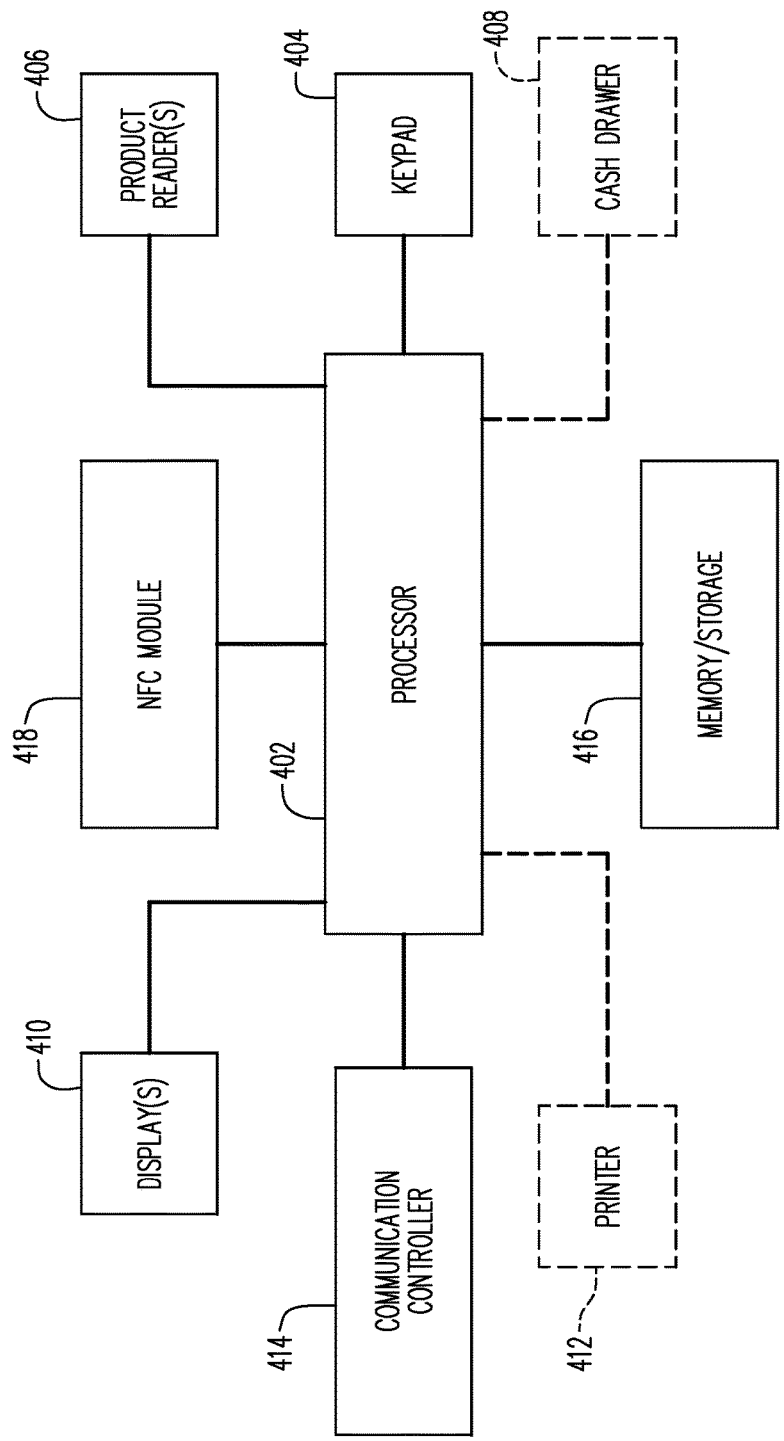
FIG. 4 is a block diagram that illustrates a point of sale (POS) terminal that may be part of the system of FIG. 2.

FIG. 4 is a block diagram that illustrates the POS terminal 202 shown in FIG. 2.

In some embodiments, the POS terminal 202 may be of a kind that is typically deployed in a retail store. Moreover, in some embodiments, the features and functions described herein may be provided in a manner that does not require the POS terminal 202 to be programmed other than in accordance with typical programming of such devices. Nevertheless, the data provided to the POS terminal 202 by the payment-enabled mobile device 204 may be configured and/or constituted in accordance with aspects of the present disclosure such that the payment system 100 provides features and functions as described herein. Further, the POS terminal 202 may insert the data it receives from the payment-enabled mobile device 204 into the form of a transaction authorization request message without departing from typical POS terminal functioning, but again the data in the resulting transaction authorization request may be such as to facilitate subsequent processing (i.e., downstream in the payment system 100) so that features and functions according to the present disclosure may be provided.

The POS terminal 202 may include a processing element (or elements) such as the processor 402 shown in FIG. 4. The processor 402 may, for example, be a microprocessor, and may operate to control the overall functioning of the POS terminal 202.

The POS terminal 202 may also include peripheral components, in communication with and/or controlled by the processor 402, such as: (a) a keypad 404 for receiving input from the human operator of the POS terminal; (b) a product reader 406 for reading any form of unique product identifier, such as a barcode or RFID, that appears on, or is attached to, products brought to the terminal for purchase; (c) a cash drawer 408 for storing cash received from customers; (d) one or more displays 410 for providing output (e.g., identifying products presented for purchase and their prices, indicating sales tax due, indicating transaction subtotals and totals, etc., providing prompts to the customer and/or to the sales associate); (e) a printer 412 for printing out sales receipts; and (f) a communication controller 414 for allowing the processor 402, and hence, the POS terminal 202 to engage in communication over data networks with other devices (e.g., the acquirer 116, FIG. 2). In some embodiments, at least one of the displays 410 may be a touch screen, so as to provide an input function as well as an output function.

In addition, the POS terminal 202 may include one or more memory and/or data storage devices (indicated collectively at 416), which may comprise any combination of one or more of a hard disk drive, RAM (random access memory), ROM (read only memory), flash memory, etc. The memory/data storage device(s) 416 may store software and/or firmware that programs the processor 402 and the POS terminal 202 to perform functionality as described herein. Thus the memory/data storage device(s) 416 may be in communication with the processor 402. Further, the POS terminal 202 may include one or more housings (not shown) which contain and/or support one or more of the other components shown in FIG. 4.

Furthermore, the POS terminal 202 may include an NFC module (reference numeral 418) to enable the POS terminal 202 to engage in short range wireless data communications with payment-enabled mobile devices such as device 204 (FIG. 2). The NFC module 418 is in communication with the processor 402.

Figure 5:
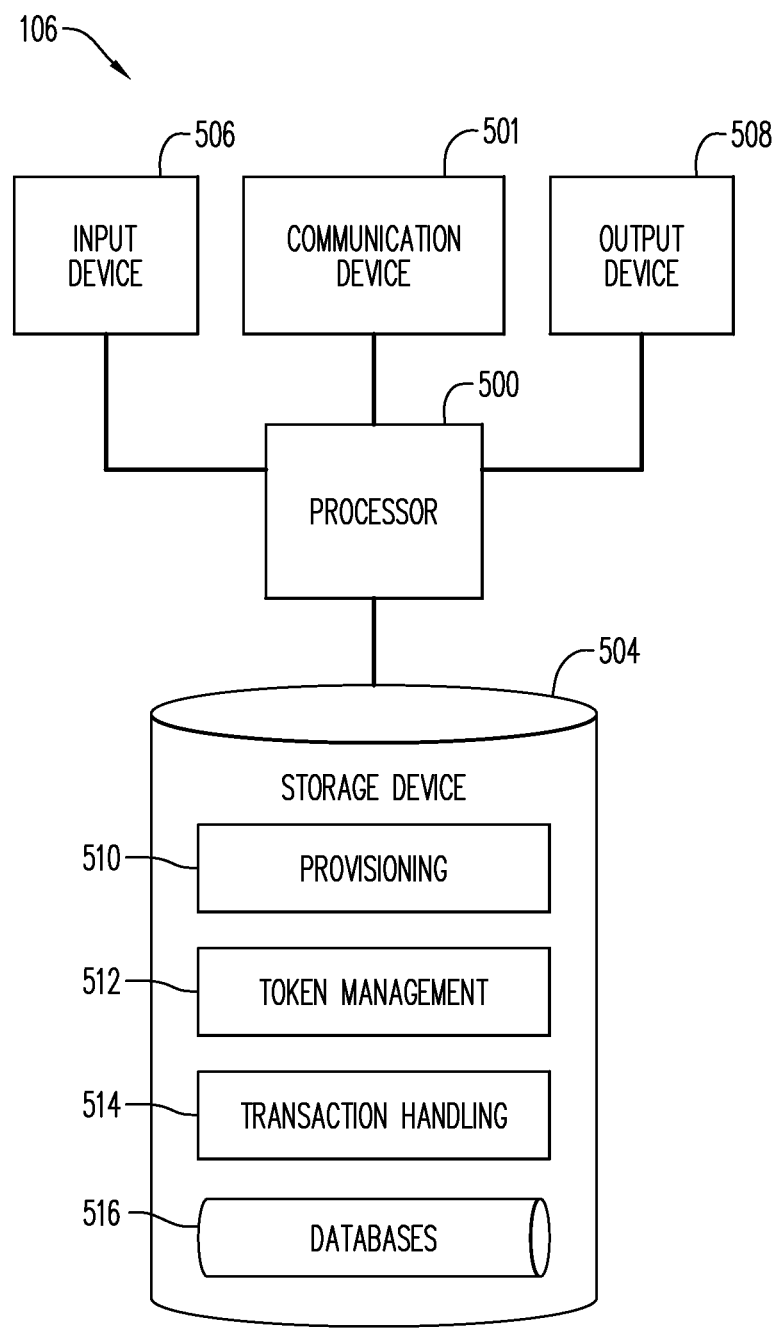
FIG. 5 is a block diagram that illustrates a computer system that may be operated as part of the system of FIG. 2 and in accordance with aspects of the present disclosure.

FIG. 5 is a block diagram that illustrates an example embodiment of a computer that embodies at least part of the functionality of the payment support service/payment network block 106. For convenience of reference, the computer illustrated in FIG. 5 will be referred to as the "payment support service computer 106". This computer may be provided in accordance with aspects of the present disclosure.

Referring now to FIG. 5, the payment support service computer 106 may be constituted by standard components in terms of its hardware and architecture but may be controlled by software to cause it to function as described herein. For example, the payment support service computer 106 may be constituted by server computer hardware.

The payment support service computer 106 may include a computer processor 500 operatively coupled to a communication device 501, a storage device 504, an input device 506 and an output device 508.

The computer processor 500 may be constituted by one or more processors. Processor 500 operates to execute processor-executable steps, contained in program instructions described below, so as to control the payment support service computer 106 to provide desired functionality.

Communication device 501 may be used to facilitate communication with, for example, other devices (such as computers operated by acquirers and issuers and one or more computers operated by the payment network, and numerous payment-enabled mobile devices such as the device 204 depicted in FIGS. 2 and 3). For example (and continuing to refer to FIG. 5), communication device 501 may comprise numerous communication ports (not separately shown), to allow the payment support service computer 106 to communicate simultaneously with a number of other computers and other devices, including communications as required to simultaneously handle numerous payment transactions.

Input device 506 may comprise one or more of any type of peripheral device typically used to input data into a computer. For example, the input device 506 may include a keyboard and a mouse. Output device 508 may comprise, for example, a display and/or a printer.

Storage device 504 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 504 stores one or more programs for controlling processor 500. The programs comprise program instructions (which may be referred to as computer readable program code means) that contain processor-executable process steps of the payment support service computer 106, executed by the processor 500 to cause the payment support service computer 106 to function as described herein.

The programs may include one or more conventional operating systems (not shown) that control the processor 500 so as to manage and coordinate activities and sharing of resources in the payment support service computer 106, and to serve as a host for application programs (described below) that run on the payment support service computer 106.

The storage device 504 may store a provisioning application program 510 that controls the processor 500 to enable the payment support service computer 106 to provide provisioning services by which payment accounts may be digitized into payment-enabled mobile devices. The payment applications and payment credential data provisioned by the payment support service computer 106 to the payment-enabled mobile devices may support features and functions as disclosed herein.

A token management application program 512 may also be stored in the storage device 504. The token management application program 512 may control the processor 500 to enable the payment support service computer 106 to activate, discard and manage the life cycles of tokens issued by the payment support service computer 106 in conjunction with the token vault 110 (FIG. 1).

Continuing to refer to FIG. 5, the programs stored in the storage device 504 may also include a transaction handling application program 514 that controls the processor 500 to enable the payment support service computer 106 to handle requests for payment transactions in a manner described herein.

The storage device 504 may also store, and the payment support service computer 106 may also execute, other programs, which are not shown. For example, such programs may include a reporting application, which may respond to requests from system administrators for reports on the activities performed by the payment support service computer 106. The other programs may also include, e.g., one or more data communication programs, database management programs, device drivers, etc.

The storage device 504 may also store one or more databases 516 required for operation of the payment support service computer 106. Such databases may include, for example, a database of issuer identification numbers (e.g., PAN-length BINs), and associated cryptographic keys and other data needed for the payment support service computer 106 to properly process transaction authorization request messages appointed for routing to account issuers.

Figure 6:
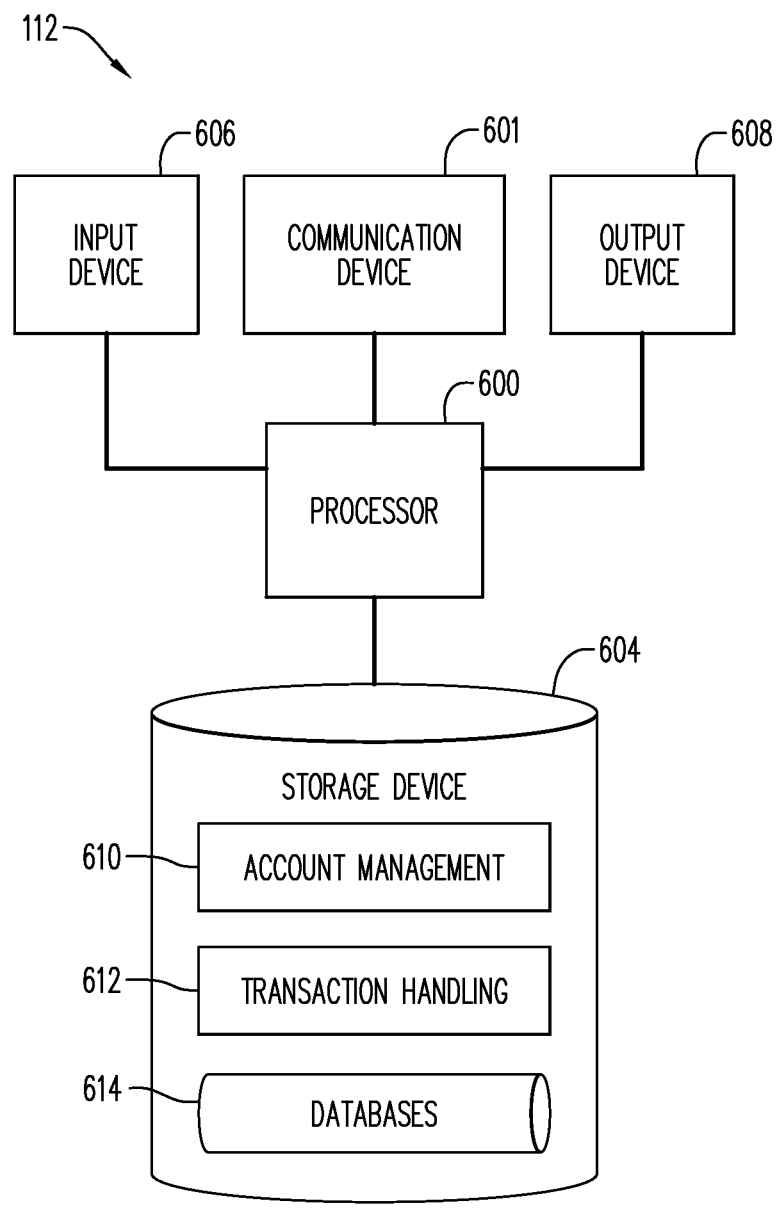
FIG. 6 is a block diagram that illustrates a computer system that may be operated by a payment account issuer as part of the system of FIG. 2.

FIG. 6 is a block diagram representation of an account issuer computer 112, which may be operated by the account issuer shown in FIGS. 1 and 2. The components, and interrelations among components, of the account issuer computer 112 may be similar to those described above with reference to the payment support service computer 106 shown in FIG. 5. However, the account issuer computer 112 may be programmed differently from the payment support service computer 106 so as to provide different functionality from the payment support service computer 106. It will be appreciated that the account issuer computer 112 may include a processor 600, communication device 601, storage device 604, input device 606 and output device 608, all of which may be similar to like components described above in connection with FIG. 5.

The storage device 604 of the account issuer computer 112 may store an account management application program 610, which may control the processor 600 to enable the account issuer computer 112 to manage payment accounts issued by the account issuer that operates the account issuer computer 112. Account management functions provided by the application program 610 may include account opening, account closing, and tracking charges to payment accounts, billing, and receiving and crediting payments.

In addition, the storage device 604 may store a transaction handling application program 612. The transaction handling application program may control the processor 600 to enable the account issuer computer 112 to perform transaction handling operations with respect to transactions charged to the payment accounts issued by the account issuer.

In some embodiments, the program functionality provided by application programs 610 and 612 may follow typical practices for programming account issuer computers, except that those programs may be modified in accordance with teachings of the present disclosure to allow account holders to assign purchase transactions to sub-accounts associated with at least some of the payment accounts issued by the issuer. However, in other embodiments, the account issuer may not offer the sub-account features and functions described herein, in which case typical programming practices may be followed in providing the account issuer computer 112.

The storage device 604 may also store one or more databases 614 required for operation of the account issuer computer 112.

Figure 7:
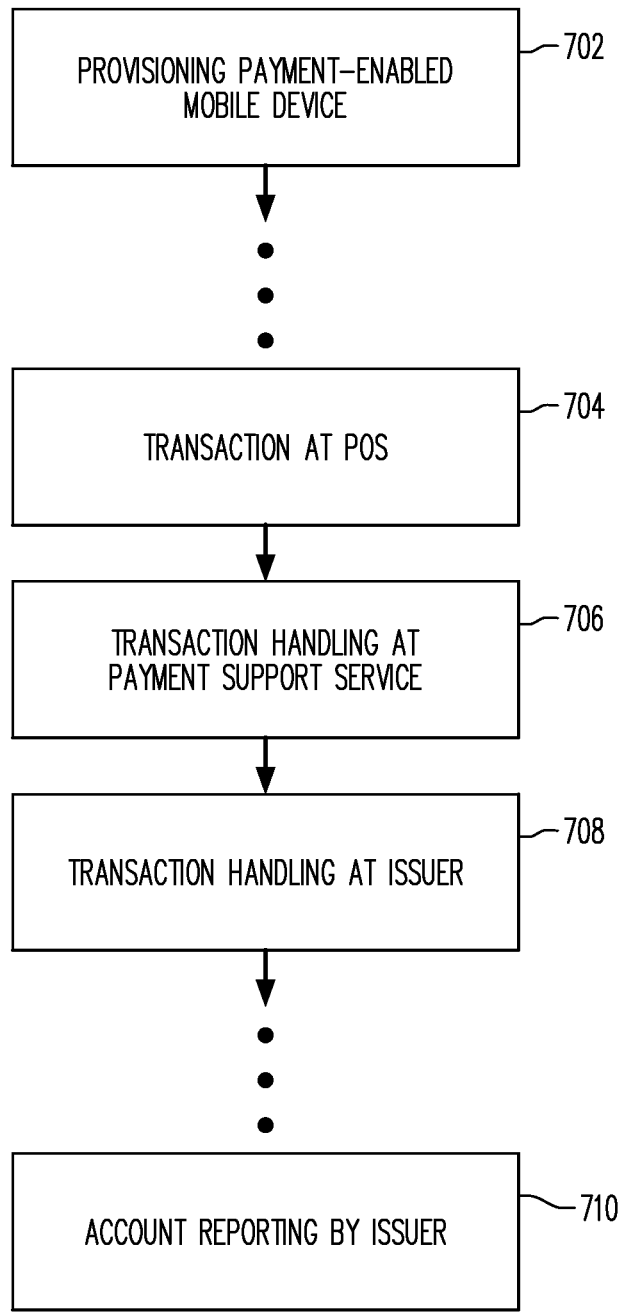
FIG. 7 is a high-level flow chart that illustrates a process that may be performed in the payment system of FIG. 2.

FIG. 7 is a high level flow chart that illustrates a process that may be performed in the payment system 100 shown in FIGS. 1 and 2.

Block 702 in FIG. 7 represents provisioning of one or more sets of payment credentials to the payment-enabled mobile device 204 from the payment support service computer 106 on behalf of one or more account issuers, including the issuer 112 shown in FIGS. 1 and 2. This may occur at the request of the user/account holder 102, and may be triggered by the user with concurrence of the issuer, or may be triggered by the issuer upon request to the issuer from the user. The provisioning may involve utilization of a communication channel (not shown) between the payment support service computer 106 and the payment-enabled mobile device 204. The communication channel may, for example, be an over-the-air channel, as has been previously proposed. Other modes of communication from the payment support service computer 106 to the payment-enabled mobile device 204, or between the payment support service computer 106 and the payment-enabled mobile device 204 may be utilized. "ID&V" (identification and verification) processes, per the Tokenization Standard, may be undertaken in connection with token provisioning.

The digital material provisioned to the payment-enabled mobile device may include one or more payment application programs, one or more PANs, one or more tokens, one or more cryptographic keys, and/or one or more sets of flags. In accordance with aspects of the present disclosure, the digital material provisioned to the payment-enabled mobile device may include strings of digits for identifying the account issuer in a format that has not previously been proposed. In typical practices heretofore, the account issuer has been identified by a leading part of a PAN or token. Typically, that leading part of the PAN or token has been referred to as a BIN (bank identification number) and consists of the first six digits of the PAN or token. In many systems, the entire PAN or token consists of 16 digits including the BIN as the first six digits. Other portions of a typical PAN or token serve to directly or indirectly identify a specific payment account. Often one digit, such as the last digit, is a check digit.

According to aspects of the present disclosure, provisioning of at least some payment accounts to the payment-enabled mobile device includes loading into the payment-enabled mobile device a string of digits that is the same length as a typical PAN but that (apart perhaps from a check digit) is entirely used for identifying the account issuer of the payment account in question. This issuer identifier may sometimes be referred to as a PAN-length identifier for the issuer, with the term "PAN-length" being an adjective that refers to the number of digits making up the identifier. Even if one or more of the digits in the PAN-length identifier are check digits, it can be said that all digits of the PAN-length are used to identify the issuer. This is contrary to the above-noted manner of identifying the issuer based on a leading portion of the PAN or token. In some embodiments, PAN-length issuer identifiers to be processed by the payment support service computer 106 may share common leading portions (e.g., the first six digits) even though the issuer identifiers in question indicate different issuers. That is, the first six digits of the PAN-length issuer identifiers may not be specific to any particular account issuer. As will be seen, an additional function of the PAN-length issuer identifiers, and particularly the first six digits thereof, may be to identify the payment support service computer 106 for the purpose of routing transaction authorization request messages to the payment support service computer 106. The PAN-length issuer identifiers may contain no information specific to a particular payment account, other than identification of the account issuer.

Another function of the PAN-length issuer identifier may be to indicate a type of interchange fee that applies to transactions in which the PAN-length issuer identifier is presented as part of the user's payment credentials.

In some embodiments, the standard PAN length and/or token length may be 16 digits, so that the above-mentioned PAN-length issuer identifiers may in such embodiments consist of 16 digits. However, as is understood by those who are skilled in the art, different account number lengths may be used in different systems. Among other possible embodiments, the PAN-length issuer identifiers may have a standard length of 14 digits or a number of digits larger than 14.

The provisioning of payment account information to the payment-enabled mobile device may include, in addition to the above-mentioned PAN-length issuer identifier, loading of account-specific information, such as a token or PAN. Still further, in accordance with aspects of the present disclosure, the digital material loaded to the payment-enabled mobile device may include a set of one or more flags to be used, as described below, in transforming account-specific and/or device-specific information so as to render such information variable from transaction to transaction (i.e., "dynamic") in terms of how it is provided to the POS terminal and/or incorporated in the transaction authorization request message provided by the POS terminal.

It should also be noted that one or more payment application programs provisioned to the payment-enabled mobile device may contain program instructions provided in accordance with aspects of the present disclosure, such that the payment-enabled mobile device operates in a manner described below in connection with FIGS. 8 and 9.

At some point in time after the payment-enabled mobile device has been provisioned with one or more sets of payment credentials, the payment-enabled mobile device may be employed to engage in a purchase transaction with a POS terminal. Such a process is represented at block 704 in FIG. 7. Details of the process are illustrated in the flow chart shown in FIG. 8.

Figure 8:
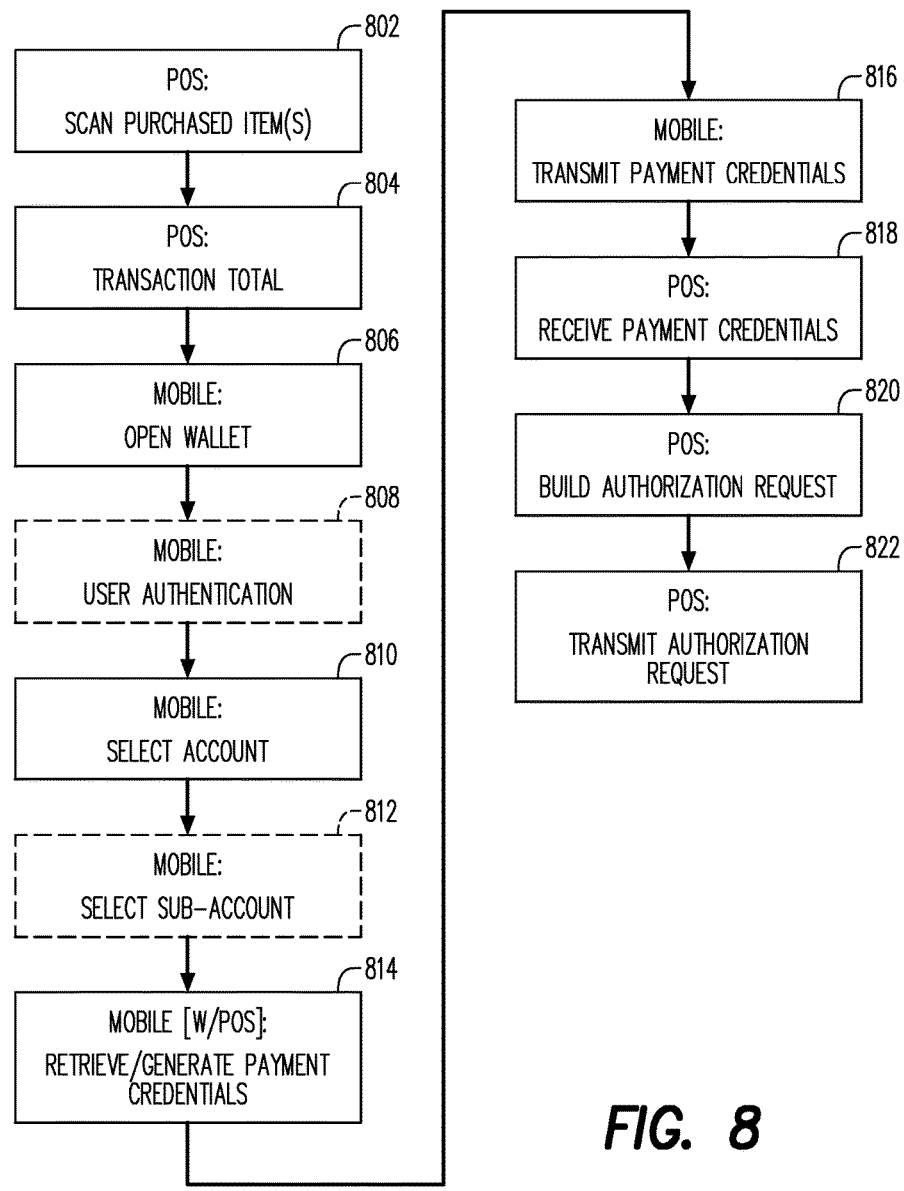
FIGS. 8-12 are further flow charts that illustrate details of the process of FIG. 7.

Referring to FIG. 8, at 802, one or more items of merchandise selected by the user/customer/account holder may be scanned by the POS terminal to identify the items and to look up the prices therefor. At 804, the POS terminal generates the total amount due for the transaction.

At 806, the user may operate the payment-enabled mobile device to open a wallet application program ("wallet app") on the payment-enabled mobile device. At least in some embodiments, this may involve the wallet app requiring a user-authentication procedure to be successfully performed by the user. (User authentication is represented by block 808 in FIG. 8.) Possible types of user authentication may include biometric authentication (e.g., reading the user's fingerprint) or entry of a PIN required for access to the wallet app.

Assuming that user authentication, if required, was successfully completed, then the wallet app may allow the user to select from among a number of payment accounts that have been associated with the wallet app. The user's selection of a particular account for the transaction is indicated by block 810.

In some embodiments, and for at least some payment accounts—if selected for use—the user may also be prompted to select among a number of sub-accounts associated with the selected payment account. In some embodiments, for example, the issuer of the payment account in question may provide a facility to the user (as implemented beforehand relative to the current transaction) to allow the user to set-up one or more sub-accounts in association with a particular payment account issued by the issuer. In one example embodiment, there may be two sub-accounts associated with the payment account, with one of the sub-accounts corresponding to "general" expenditures and the other corresponding to "discretionary" expenditures. As will be seen, this may enable the user to make use of transaction tracking and reporting facilities offered by the issuer to assign the user's transactions (at the time of purchase) on the payment account between general and discretionary purchases, which thereafter may be separately reported to the user via statements or records that the issuer provides to the user with respect to the payment account. In some embodiments, the sub-accounts may have different labels, such as "personal" vs. "business"; or "personal" vs. "reimbursable"; or "general" vs. "(tax) deductible"; and so forth. In some embodiments, (e.g., with respect to a "discretionary" sub-account), the issuer may decline the transaction if the sub-account has been exhausted, thereby aiding the user in setting a limit on discretionary spending.

Selection by the user of a sub-account, if this step occurs, is represented at block 812 in FIG. 8.

At block 814, the payment-enabled mobile device, potentially with interaction involving the POS terminal, may retrieve and/or generate payment credentials for the payment account selected at 810. If selection of a sub-account also occurred, the payment credentials as retrieved/generated by the payment-enabled mobile device may also reflect the sub-account selected at block 812.

Figure 9:
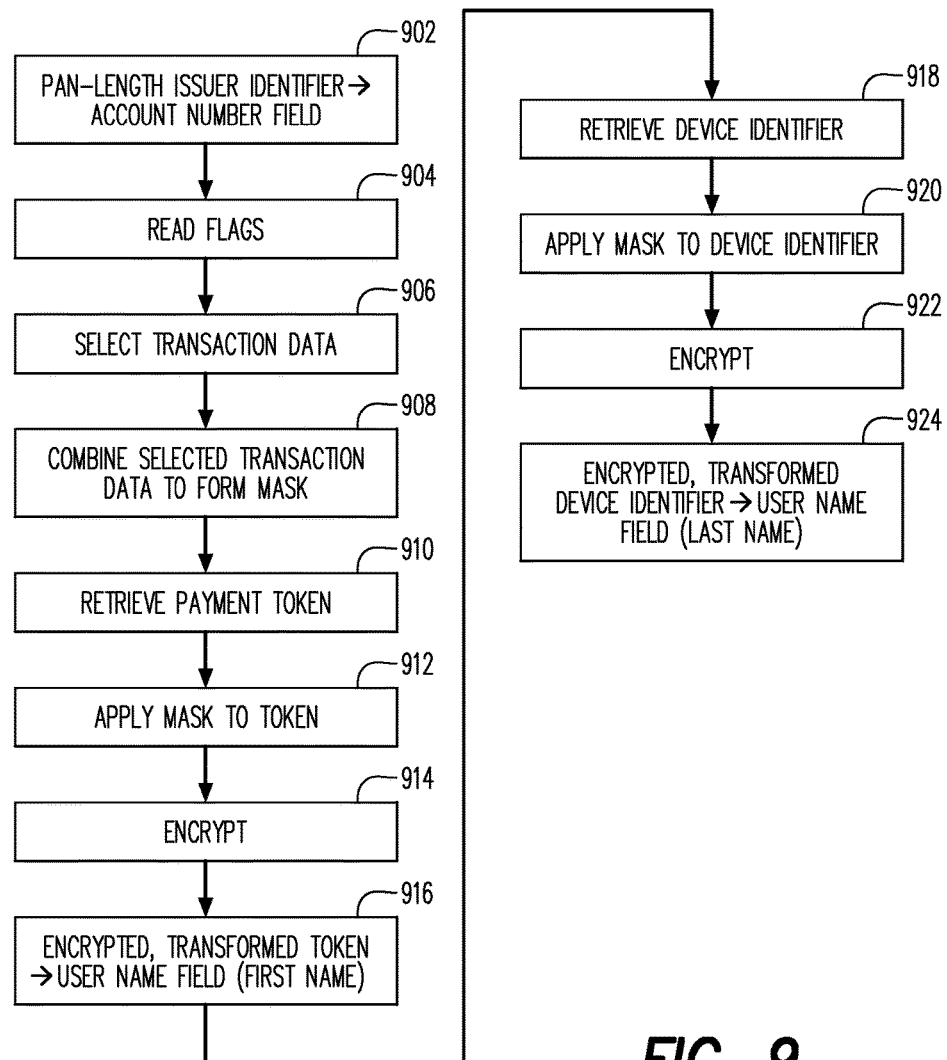

Details of block 814 are illustrated in the flow chart shown in FIG. 9.

Referring to FIG. 9, at block 912 the payment-enabled mobile device retrieves a PAN-length issuer identification number that identifies the issuer of the payment account selected at 810. The payment-enabled mobile device may insert the retrieved PAN-length issuer identification number in a data field that is typically used to carry a payment account number or payment token.

In some embodiments, the payment-enabled mobile device may retrieve the PAN-length issuer identifier from the secure element 328 shown in FIG. 3. However, in alternative embodiments, the payment credentials accessible via the payment-enabled mobile device may be secured "in the cloud"; i.e., in a remote server (not shown) that may be securely accessed via a secure execution environment in the payment-enabled mobile device. In such cases, the payment-enabled mobile device may retrieve the PAN-length issuer identifier (and other aspects of payment credentials, as referred to below) from the remote server. (In some embodiments, the "cloud-based secure element" functionality referred to above may be part of the functions provided by the payment support service computer 106.)

At 904, the payment-enabled mobile device may read one or more flags that correspond to the PAN-length issuer identifier selected at 902 and that have been associated with that account during the provisioning of the account to the payment-enabled mobile device. The purpose of the flag(s) is(are) to indicate to the payment-enabled mobile device one or more items of transaction data that the payment-enabled mobile device is to employ in transforming account-specific information (a PAN or—more likely—a token) before providing the account-specific information to the POS terminal. As noted before, the account-specific information may be referred to as an "account indicator".

At 906, the payment-enabled mobile device may select the item(s) of transaction data indicated by the flag(s) read at 904. The transaction data may have been previously transferred from the POS terminal to the payment-enabled mobile device (e.g., at or between steps 804 and 806 shown in FIG. 8) and/or may be supplied to the payment-enabled mobile device from the POS terminal as part of an interaction during this block 814 (FIG. 8) as now being described with reference to FIG. 9. Examples of the transaction data may include a service code, a transaction total amount, a merchant identifier, or any other data typically transmitted from the POS to an intelligent payment device as part of a payment account transaction. Assuming that the flag(s) indicate selection of more than one item of transaction data, then block 908 may follow block 906 in FIG. 9. At block 908, the payment-enabled mobile device may combine the selected items of transaction data to form a dynamic mask. In some embodiments, the mask may be formed by applying an XOR function to the selected items of transaction data. In addition or alternatively, the selected items of transaction data may be concatenated (e.g., in an order as indicated by a flag or flags read at 904).

At 910, the payment-enabled mobile device may retrieve the account indicator (typically a token) from the payment credentials associated with the payment account selected at 810. In some embodiments, the token may also be indicative of a sub-account selected at 812.

At 912, the payment-enabled mobile device may apply the mask formed at 908 to the token retrieved at 910 so as to transform the token. For example, the payment-enabled mobile device may apply an XOR function to the mask and token. Those who are skilled in the art will recognize that there are other types of reversible transformation that may be employed using the mask instead of an XOR function.

At 914, the payment-enabled mobile device may encrypt the transformed token produced at 912. In doing so, the payment-enabled mobile device may use a cryptographic key that was associated with the PAN-length issuer identifier at the time of provisioning the payment account to the payment-enabled mobile device.

At 916, the payment-enabled mobile device may insert the encrypted, transformed token into an optional data field. One example of such an optional data field may be a field that is sometimes used to carry the account holder's name (e.g., the account holder's first name).

At 918, the payment-enabled mobile device may retrieve an identifier (e.g. a device serial number and/or type number) for the device itself.

At 920, the payment-enabled mobile device may apply the mask formed at 908 to the device identifier retrieved at 918. This process may produce a transformed version of the device identifier. As before, an XOR operation is one way in which the mask may be applied to the device identifier. In some embodiments, the mask applied at 920 may be different from the mask formed at 908 and applied at 912. For example, in some embodiments, the payment-enabled mobile device may read one or more flags to guide it to select different items of transaction data from the data items selected at 906.

At 922 in FIG. 9, the payment-enabled mobile device may encrypt the transformed device identifier produced at 920. In doing so, the payment-enabled mobile device may employ the same cryptographic key that was used at 914.

At 924, the payment-enabled mobile device may insert the encrypted, transformed device identifier in an optional data field. One example of such an optional data field may be a field that is sometimes used to carry the account holder's name (e.g., the account holder's last name).

Now that the description of block 814 in FIG. 8 is complete, reference will be made to block 816 in FIG. 8. At block 816, the payment-enabled mobile device may transmit the payment credentials to the POS terminal. That is, the payment-enabled mobile device may transmit the PAN-length issuer identifier retrieved at 902, the encrypted, transformed token produced at 912 and 914, and the encrypted, transformed device identifier produced at 920 and 922. In addition, the payment-enabled mobile device may transmit other information typically provided from a payment device to a POS terminal during a transaction.

At 818, the POS terminal may receive the payment credentials transmitted by the payment-enabled mobile device at 816.

At 820, the POS terminal may construct a transaction authorization request message for the transaction. In some embodiments, this may include inserting the PAN-length issuer identifier in the account number data field for the transaction authorization request message, inserting the encrypted, transformed token in the account holder first name data field in the transaction authorization request message, and inserting the encrypted, transformed device identifier in the account holder last name data field in the transaction authorization request message. Other data typically included in a transaction authorization request message at the point of sale, including transaction data, may also be included in the transaction authorization request message as constructed by the POS terminal.

At 822, the POS terminal may transmit the transaction authorization request message that it constructed at 820. As suggested by earlier discussion, the routing of the transaction authorization request message may proceed based on the first six digits of the PAN-length issuer identifier. As indicated above, those six digits may indicate the payment support service computer 106 (FIGS. 2 and 3) as an intermediate destination for the transaction authorization request message. In accordance with typical practices, the POS terminal may transmit the transaction authorization request message to the acquirer 116 (FIG. 2) for subsequent routing in accordance with the first six digits of the account number field.

In some embodiments, the POS terminal may perform steps 818, 820 and 822 in FIG. 8 in the same manner as if the data elements received from the payment-enabled mobile device were a typical PAN or token, plus the account holder's first and last names, rather than the data elements provided in accordance with the teachings of this disclosure, as described in connection with FIG. 9. In other words, in embodiments of the present invention the POS terminal need not be reprogrammed or reconfigured to accommodate and relay the data elements provided by the payment-enabled mobile device as described in connection with FIG. 9.

In some embodiments of the process of FIG. 8, steps 810 and 812 may be collapsed/combined. For example, the wallet app may give the user an option to select among sub-accounts without previously having selected an associated payment account. Accordingly, in such cases, the user's selection of the sub-account implicitly also selects the associated payment account.

Figure 10:
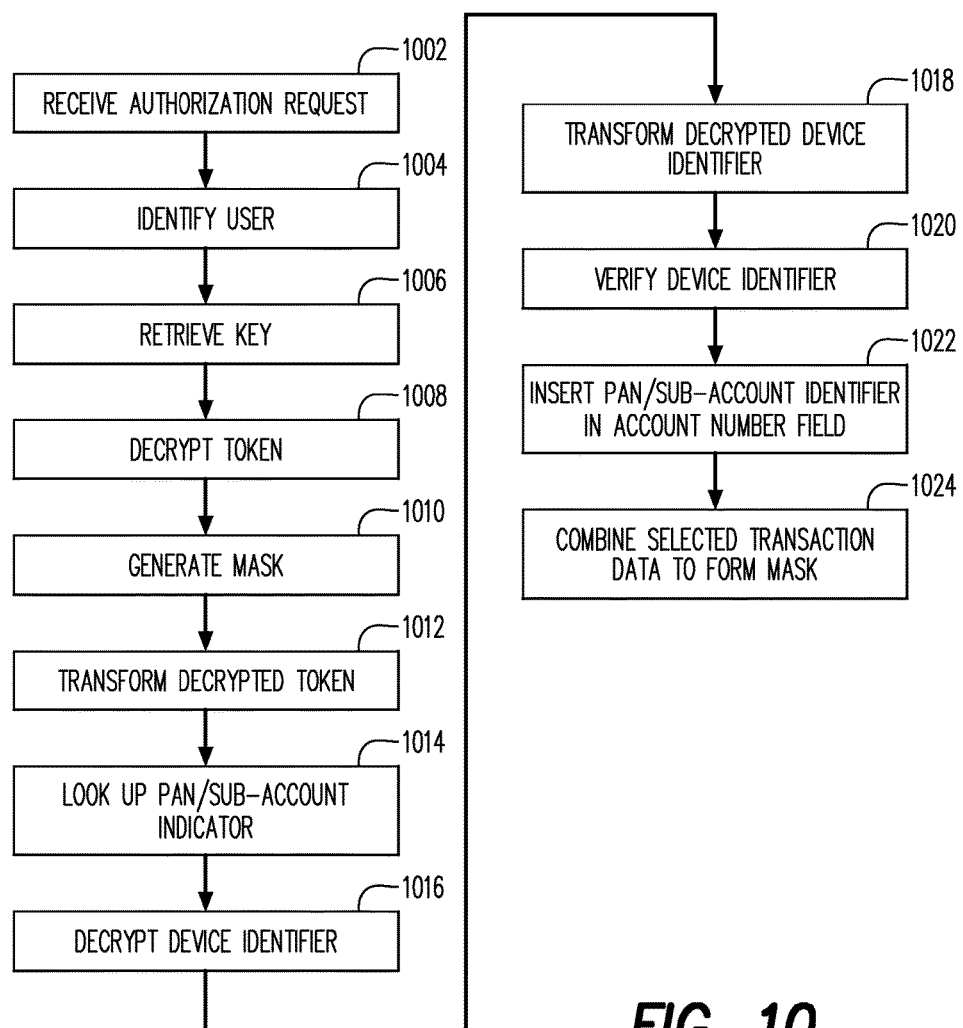

As noted above, after the POS terminal transmits the transaction authorization request message, the message may be routed to the payment support service computer 106. Block 706 in FIG. 7 represents the processing performed by the payment support service computer 106 in connection with the transaction in response to receiving the transaction authorization request message. FIG. 10 is a flow chart that illustrates details of the processing at block 706.

Referring to FIG. 10, block 1002 represents the receipt of the transaction authorization request message by the payment support service computer 106.

At 1004, the payment support service computer 106 uses the PAN-length issuer identifier included in the account number field of the transaction authorization request message to identify the issuer of the payment account selected by the account holder at 810 in FIG. 8.

Continuing to refer to FIG. 10, at 1006, the payment support service computer 106 retrieves a cryptographic key associated with the issuer identified at 1004.

At 1008, the payment support service computer 106 uses the cryptographic key retrieved at 1006 to decrypt the token as included in its encrypted (and transformed) form in the account holder first name field of the transaction authorization request message.

Figure 11:
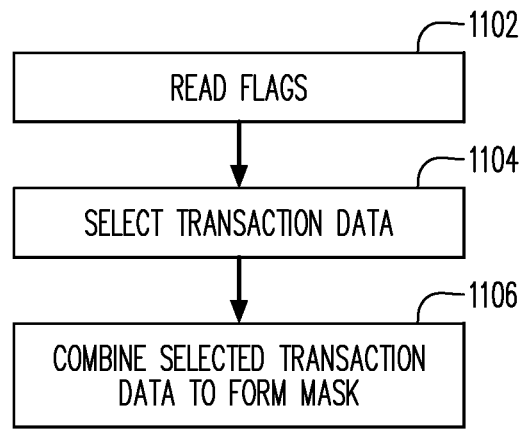

At 1010, the payment support service computer 106 uses transaction data included in the transaction authorization request message to form the same mask that the payment-enabled mobile device had formed at block 908 in FIG. 9. FIG. 10 is a flow chart that illustrates details of the processing at 1010. At 1102 in FIG. 11, the payment support service computer may read one or more flags that correspond to the account issuer in question and/or that were associated with the PAN-length account issuer identifier included in the transaction authorization request message received at 1002. These flags may match the flags referred to above in connection with block 904 in FIG. 9. Moreover, the flags read at 1102 may have the same purpose as the flags read at 904—i.e., to indicate items of transaction data to be used in forming the mask. At 1104 in FIG. 11, the payment support service computer 106 may, based on the flags read at 1102, select from among the items of transaction data included in the transaction authorization request message received at 1002. At 1106 in FIG. 11, the payment support service computer 106 may create the mask based on the items of transaction data selected at 1104. In performing step 1106, the payment support service computer 106 may duplicate the processing performed at 908 by the payment-enabled mobile device.

At 1012, the payment support service computer 106 uses the mask formed at 1010 to transform the token from the state resulting from the decryption at 1008. This transformation at 1012 recovers the token as retrieved by the payment-enabled mobile device at 910. For example, the transformation at block 1012 may reverse the transformation performed by the payment-enabled mobile device at block 912 in FIG. 9.

At 1014, the payment support service computer 106 uses the token recovered at 1012 to look up the PAN for the payment account represented by the token and selected by the user step 810 (FIG. 8). In some embodiments, when sub-account selection has been implemented, and was performed by the user for the current transaction (as indicated at step 812, FIG. 8, if that step was performed), the payment support service computer 106 may look up a token/sub-account indicator instead of a PAN. In such a case, the token may correspond to the sub-account selected by the user at step 812. As will be seen, the account issuer may subsequently use the token looked up at 1014 to identify the sub-account selected by the user. In other embodiments, the payment support service computer 106 may look up the PAN for the payment account in all cases, irrespective of whether sub-account selection has occurred for the current transaction. For transactions where sub-account selection has occurred, a separate data element (i.e., not the PAN and not a token/sub-account indicator) may be provided by the payment support service computer 106 to signal the sub-account selection to the account issuer.

In other embodiments, a different PAN for each sub-account (e.g., a virtual PAN) may be used to distinguish between sub-accounts. For example, for a given payment account, there could be a primary PAN and N secondary PANs corresponding to N sub-accounts associated with the payment account.

At 1016, the payment support service computer 106 uses the cryptographic key retrieved at 1006—or another cryptographic key—to decrypt the device identifier as included in its encrypted (and transformed) form in the account holder last name field of the transaction authorization request message.

At 1018, the payment support service computer 106 may transform the result of the decryption step 1016. That is, for example, the payment support service computer 106 may apply in the mask generated at 1010 to recover the original, unencrypted and un-transformed device identifier. In other embodiments, if the process called for the payment-enabled mobile device to generate and use a different mask to transform the device identifier, the payment support service computer 106 may generate the latter mask and employ it to recover the device identifier. For example, the transformation performed by the payment support service computer 106 at block 1018 may reverse the transformation performed by the payment-enabled mobile device at block 920 in FIG. 9.

At 1020 in FIG. 10, the payment support service computer 106 may verify that the device identifier—as recovered at 1018—is correct.

At 1022, the payment support service computer 106 may modify the transaction authorization request message, as received at 1002, but inserting the PAN or the token/sub-account identifier (as the case may be) into the account number data field of the transaction authorization request message in place of the PAN-length account issuer identifier that occupied that data field when the payment support service computer 106 received the transaction authorization request message. As noted before, where sub-account selection applies to the transaction but a token/sub-account indicator is not employed, the payment support service computer may include a suitable sub-account indication (which may be as simple as a "0" versus "1" value for a flag in another data field) in the modified transaction authorization request message. In some embodiments, the sub-account indication may include a binary value encompassing two or more binary digits.

At 1024, the payment support service computer 106 may route the modified transaction authorization request message to the account issuer. The routing may be based on the BIN portion of the PAN; alternatively, where the payment support service computer 106 has inserted a token/sub-account indicator into the transaction authorization request, the token/sub-account indicator may include a BIN portion that corresponds to the account issuer, and the routing of the modified transaction authorization request message may be based on the BIN portion of the token/sub-account indicator. In some embodiments, the BIN portion of the token/sub-account indicator may be the same as the BIN portion of the PAN for the payment account in question, but this need not be the case.

Reference will now be made once again to FIG. 7. In FIG. 7, block 708 represents processing of the transaction at the account issuer. It will be appreciated that this processing may be triggered by the account issuer receiving the modified transaction authorization request message routed to it at 1024 in FIG. 10.

Figure 12:
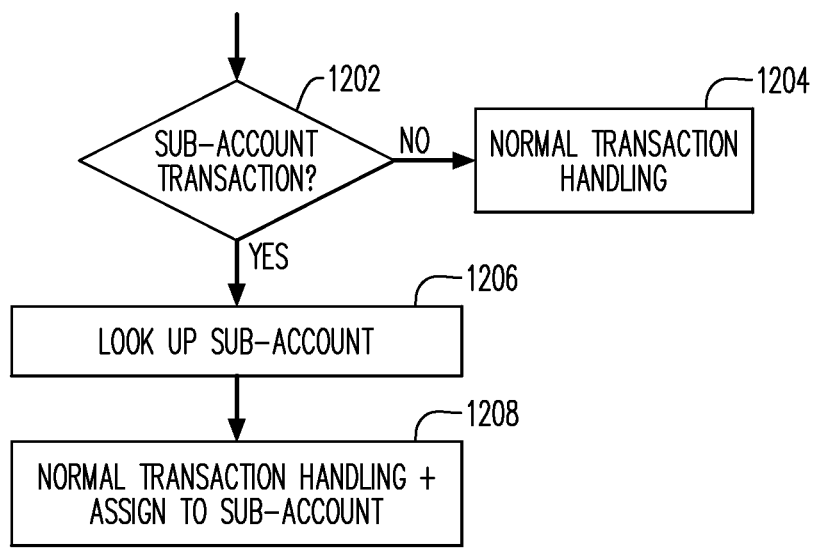

FIG. 12 is a flow chart that illustrates details of the processing by the account issuer at 708 in FIG. 7.

At a decision block 1202 in FIG. 12, the account issuer may determine whether the transaction represented by the transaction authorization request message involved sub-account selection by the account holder. In some embodiments, for example, the account issuer may make this determination upon checking the value received in the account number data field of the transaction authorization request message and determining that the value is question is a token/sub-account indicator rather than a PAN. Alternatively, in an embodiment where token/sub-account indicators are not employed (or are not employed for the particular account issuer), the account issuer may refer to one or more flags or binary values included in the transaction authorization request message in a data field apart from the account number data field.

If a negative determination is made at decision block 1202 (i.e., if the account issuer determines that the transaction does not involve selection of a sub-account), then block 1204 may follow decision block 1202 in the process of FIG. 12.

At block 1204, the account issuer may proceed to handle the transaction authorization request message in a normal manner, i.e., without any processing relating to sub-account selection. As will be readily familiar to those who are skilled in the art, the processing at 1204 may involve the account issuer preparing and transmitting a transaction authorization response message in a typical manner.

If a positive determination is made at decision block 1202 (i.e., if the account issuer determines that the transaction involves selection of a sub-account), then block 1206 may follow decision block 1202 in the process of FIG. 12.

At block 1206, the account issuer may look up the sub-account to which the current transaction is to be assigned. Where the transaction authorization request message as received by the account issuer includes a token/sub-account indicator in the account number field of the transaction authorization request message, the look-up of the selected sub-account may be based on the token/sub-account indicator. In conjunction with this look-up operation, the account issuer may also look up the PAN for the payment account in question.

Where the transaction authorization request message includes a PAN in the account number field of the transaction authorization request message, the look-up of the selected sub-account may be based on one or more flags, or one or more data bits, contained in the transaction authorization request message apart from the account number data field.

In the process of FIG. 12, block 1208 may follow block 1206. The processing at block 1208 may include the typical transaction authorization request message handling process as referred to above in connection with block 1204. In addition, the account issuer may update its transaction data records to indicate that the current transaction is being assigned to the sub-account that was selected by the user/account holder at 812.

In some embodiments, at least for issuers that do not implement sub-account assignment for transactions, block 708 shown in FIG. 7 may include only typical handling of a transaction authorization request message, rather than the process described above in connection with FIG. 12.

Referring once more to FIG. 7, processing indicated by block 710 may occur at a lapse of time after block 708. At block 710, the account issuer may provide periodic or other reporting on account activity to the account holder. This may be done via one or more conventional channels, such as via a monthly mailed paper statement, or by electronic means such as allowing the account holder to access and view account information via a website for account holders hosted by the account issuer.

FIG. 13 shows a simplified example periodic account statement that may be provided according to some embodiments by an account issuer that has implemented sub-account selection for its account holders (or at least for some of its account holders).

Referring to FIG. 13, the account statement includes a first section 1302 that lists transactions selected for assignment to a "discretionary spending" sub-account, and a second section 1304 that lists transactions selected for assignment to a "general spending" sub-account. Consider an item 1306 listed in the discretionary spending section 1302 and an item 1308 listed in the general spending section 1304. It can be inferred that the account holder selected the discretionary spending sub-account at the time he/she engaged in the transaction corresponding to item 1306, and he/she selected the general spending sub-account at the time he/she engaged in the transaction corresponding to item 1308. At some point prior to presenting the account statement shown in FIG. 13, the account issuer received a transaction authorization request message for the purchase transaction corresponding to item 1306, and assigned that transaction to the discretionary spending sub-account based on data contained in the transaction authorization request message. Moreover, also at some point prior to presenting the account statement, the account issuer received another transaction authorization message, with the latter message corresponding to a purchase transaction represented by item 1308. Further, the account issuer assigned the latter transaction to the general spending sub-account based on data contained in the latter transaction authorization request message. As noted above in connection with FIG. 12, in some embodiments, the account issuer may make the above-described assignments of transactions to sub-accounts based on tokens/sub-account indicators contained in the account number data field in the respective transaction authorization request messages, where the tokens/sub-account indicators were used to route the transaction authorization request messages to the account issuer. Alternatively, as also noted above, the indication of which sub-account the transaction is to be assigned to may be carried outside of the account number data field, in which case the payment account PAN may be carried in the account number data field.

In some embodiments, the payment system 100 may include all of the following features and functions: (a) PAN-length account issuer identifiers transmitted to a POS terminal from a payment-enabled mobile device as part of the payment credentials for a current transaction, and incorporated in an account number data field in a transaction authorization request message transmitted from the POS terminal to seek authorization for the transaction; (b)

dynamic account indicators and/or device identifiers, generated by the payment-enabled mobile device at the point of sale based on transaction-specific information and utilizing encryption, with the account indicators and/or device identifiers, in their dynamic, encrypted form, carried in an optional data field such as account holder name fields in transaction authorization request messages transmitted by the POS terminal; and (c) assignment of transactions to sub-accounts for periodic reporting purposes based on selections/indications provided by the account holder at the point of sale. In some embodiments, any one or two of these features (a), (b) and (c) may be omitted from some or all aspects of the payment system 100. For example, the payment system 100 may utilize PAN-length account issuer identifiers, as referred to above, but (at least for some issuers/account holders) may not provide sub-account selection, and may not utilize dynamic account indicators and/or device identifiers. In some embodiments, the payment system 100 may, for at least some account holders, utilize dynamic account indicators and/or device identifiers, but may not utilize PAN-length account issuer identifiers and may not offer sub-account selection. In some embodiments, the payment system 100 may offer sub-account selection, at least for some account holders and/or some issuers, but without utilizing PAN-length account issuer identifiers or dynamic account indicators and/or device identifiers.

In some embodiments, where the PAN-length issuer identifiers are used, but the dynamic account indicators are not implemented, the payment support service computer may read, e.g., a token from a non-payment-account-number data field in the transaction authorization request message, and may perform straightforward de-tokenization in accordance with the Tokenization Standard. The reading of the token and/or de-tokenization may be considered processing of the token by the payment support service computer.

Moreover, where dynamic account indicators are implemented, the decryption and/or transformation of the encrypted, transformed account indicator, as discussed above in connection with steps 1008 and 1012 in FIG. 10, may also be considered processing of the encrypted, transformed account indicator.

In some example embodiments, where dynamic account indicators are implemented, but PAN-length issuer identifiers are not implemented, the BIN portion of the account identifier may be unencrypted and not transformed, thereby supporting routing of the transaction authorization request message and aiding the payment support service computer 106, or the issuer, to recover the original account identifier as retrieved by the payment-enabled mobile device. In some embodiments, the transaction authorization request message may carry a flag or flags to indicate that the device identifier and/or part of the account indicator is "dynamic".

In some embodiments, dynamic account indicators may be used, but not dynamic (or any) device identifiers. In some embodiments, dynamic device identifiers may be used, but not dynamic account indicators. In some situations, it may be feasible to dispense with using an account indicator per se; that is, for example, where a PAN-length account issuer identifier is used, the payment support service computer may be able to identify the payment account to be charged based on the device identifier for a payment-enabled device that has been associated with the payment account in question. In other words, in some embodiments, the device identifier, whether or not dynamically modified at the point of sale, may function as a payment token, with de-tokenization occurring in effect at the payment support service computer.

In embodiments described above, the account mask and/or cryptographic key used are associated with a particular PAN-length issuer identifier. Alternatively, however, a device level mask and key may be based on the issuer identifier, and the account mask and key may be more granular. For example, the device level mask and key could be configured based on the PAN-length issuer identifier and then the account level mask and key could be configured at the device level. For example, all payment accounts of a certain type from a given issuer could share a single mask and key for device identification, while every account from that issuer and of that type on a given user's device could share a mask and key unique to that device. This would still be reversible as the payment support service computer could first use the account-type mask and key to retrieve the device identifier to decrypt and unmask the device identifier and then use that device's mask and key to decrypt and unmask the payment account.

Processes described above, including in conjunction with FIGS. 9 and 10, have included use of cryptographic keys. In various embodiments either symmetric or asymmetric (e.g., public/private) keys may be used. In the latter case, the public key may be provisioned to the payment devices with the private key held at the payment support service computer.

Use of PAN-length account issuer identifiers may be advantageous in allowing a considerable number of different account issuers to effectively share a BIN in the credentials provisioned to payment-enabled mobile devices and/or included in transaction authorization request messages transmitted from POS terminals, thereby potentially avoiding shortages of BINS that may otherwise be encountered in a tokenization system.

Use of dynamic account indicators and/or device identifiers may enhance the security of payment systems, by providing additional barriers to interception of account indicators or device identifiers by wrongdoers. The account indicators protected may be payment tokens or PANS. In other words, it is not necessarily the case that the dynamic account indicator feature would be employed only in a tokenization system.

Either or both of the PAN-length account issuer identifier feature and the dynamic account indicator/device identifier feature may be implemented in some embodiments without requiring reprogramming or reconfiguring of POS terminals of the types typically deployed by merchants. It may also be the case that PAN-length account issuer identifiers and dynamic account indicators/device identifiers may be implemented without reprogramming or reconfiguring typical issuer transaction processing systems. The PAN-length issuer identifier and/or dynamic account indicator and/or device identifier features may be implemented through suitable provisioning and programming of payment-enabled mobile devices and by providing a suitable payment support service computer, as described herein.

Use of the sub-account selection feature may provide additional information and spending management functionality that may be attractive and convenient for account holders.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment system account" includes a credit card account or a deposit account that the account holder may access using a debit card. The terms "payment system account", "payment account" and "payment card account" are used interchangeably herein. The term "payment account number" includes a number that identifies a payment system account or a number carried by a payment card, or a number that is used to route a transaction in a payment system that handles debit card and/or credit card transactions. The term "payment card" includes a credit card, a debit card or a pre-paid card.

As used herein and in the appended claims, the term "payment system" refers to a system for handling purchase transactions and related transactions. An example of such a system is the one operated by MasterCard International Incorporated, the assignee of the present disclosure. In some embodiments, the term "payment system" may be limited to systems in which member financial institutions issue payment accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   receiving an encrypted account indicator in a POS (point of sale) terminal, said encrypted account indicator representing a payment account issued in a payment system;
   inserting account-issuer identifying data in a payment account number data field in a transaction authorization request, the account-issuer identifying data different from the encrypted account indicator, said payment account number data field being a first data field;
   inserting, by the POS terminal, the encrypted account indicator in a second data field in the transaction authorization request, the second data field different from the payment account number data field; and
   routing the transaction authorization request, with the inserted account-issuer identifying data and the inserted encrypted account indicator, from the POS terminal based on the account-issuer identifying data; said account-issuer identifying data being a PAN-length (primary-account-number-length) account-issuer identifier, said PAN-length account-issuer identifier consisting of a number of digits equal to a standard length of PANs in said payment account system, all of said digits of said PAN-length account-issuer identifier used for identifying an issuer of said payment account represented by the encrypted account indicator, said account-issuer identifying data being in said payment account number data field in the transaction authorization request at a time of said routing the transaction authorization request from the POS terminal.

2. The method of claim 1, wherein the routing step includes routing the transaction authorization request to a payment support service for decryption of the encrypted account indicator by the payment support service.

3. The method of claim 1, wherein the second data field is an account holder name data field.

4. The method of claim 1, further comprising:
   before the routing step:
      receiving an encrypted device identifier in the POS terminal; and
      inserting the encrypted device identifier in a third data field in the transaction authorization request.

5. A method comprising:
   receiving an encrypted device identifier in a POS (point of sale) terminal;
   inserting account-issuer identifying data in a payment account number data field in a transaction authorization request, the account-issuer identifying data different from the encrypted device identifier, said payment account number data field being a first data field;
   inserting, by the POS terminal, the encrypted device identifier in a second data field in the transaction authorization request, the second data field different from the payment account number data field; and
   routing the transaction authorization request, with the inserted account-issuer identifying data and the inserted encrypted account indicator, from the POS terminal based on the account-issuer identifying data;
   said account-issuer identifying data being a PAN-length (primary-account-number-length) account-issuer identifier, said PAN-length account-issuer identifier consisting of a number of digits equal to a standard length of PANs in a payment account system, all of said digits of said PAN-length account-issuer identifier used for identifying an issuer of a payment account held by a user of a device identified by the encrypted device identifier, said account-issuer identifying data being in said payment account number data field in the transaction authorization request at a time of said routing the transaction authorization request from the POS terminal.

* * * * *